United States Patent [19]

Inoue et al.

[11] Patent Number: 5,242,637
[45] Date of Patent: Sep. 7, 1993

[54] PROCESS FOR THE PRODUCTION OF COMPOSITE MOLDED ARTICLES

[75] Inventors: Masataka Inoue; Hiroshi Aoyagi; Michio Yamamoto; Takeyoshi Yamada; Shigekazu Kimura, all of Iwakuni, Japan

[73] Assignee: Teijin Limited, Osaka, Japan

[21] Appl. No.: 861,090

[22] Filed: Mar. 31, 1992

Related U.S. Application Data

[63] Continuation-in-part of Ser. No. 552,688, Jul. 12, 1990, abandoned.

[30] Foreign Application Priority Data

| Jul. 12, 1989 | [JP] | Japan | 1-179830 |
| Oct. 2, 1989 | [JP] | Japan | 1-255304 |
| Oct. 2, 1989 | [JP] | Japan | 1-255305 |
| Dec. 7, 1989 | [JP] | Japan | 1-316403 |

[51] Int. Cl.$^5$ .................................. B29C 67/22
[52] U.S. Cl. ............... 264/45.3; 264/45.4; 264/46.6; 264/126; 264/257; 264/258; 264/273; 264/DIG. 6
[58] Field of Search ............... 264/45.1, 45.4, 126, 264/257, 273, 109, DIG. 6, 258, 46.6, 45.3

[56] References Cited

U.S. PATENT DOCUMENTS

| 3,328,500 | 6/1967 | Barnette | 264/273 |
| 3,634,578 | 1/1972 | Suzuki | 264/273 |
| 3,842,020 | 10/1974 | Garrett | 264/225 |
| 4,025,686 | 5/1977 | Zion | 428/402 |
| 4,040,165 | 8/1977 | Miessler et al. | 264/109 |
| 4,303,602 | 12/1981 | Lichter et al. | 264/109 |
| 4,714,575 | 12/1987 | Preston | 264/46.4 |
| 4,927,575 | 5/1990 | Brock et al. | 264/46.7 |
| 4,952,350 | 8/1990 | Duffy | 264/45.1 |

FOREIGN PATENT DOCUMENTS

0272359 6/1988 European Pat. Off.

Primary Examiner—Allan R. Kuhns
Attorney, Agent, or Firm—Wenderoth, Lind & Ponack

[57] ABSTRACT

A process for the production of an integral composite molded item including
(i) a surface portion having a synthetic resin phase containing a fibrous reinforcing material,
(ii) a core portion having the synthetic resin phase containing bubble-containing particles, and
(iii) a separation layer positioned between the surface portion and the core portion, the process including the steps of:
providing in a substantially sealed mold (1) a separation layer which does not substantially pass therethrough bubble-containing particles but which is capable of passing a synthetic resin or its precursor that is liquidized at the time of molding; (2) a synthetic resin or its precursor on either or both sides of the separation layer; (3) a fibrous reinforcing material between the separation layer and the mold, and (4) an aggregate of bubble-containing particles on the side of the separation layer opposite to the mold;
causing volume expansion of the aggregate;
causing the resin to flow through the separation layer to thoroughly disperse it between the separation layer, mold, and particles to fill any voids therebetween; and
completing solidification of the resin to form the composite molded item.

The type of the resin and the type of bubble-containing particles may be selected and combined differently.

32 Claims, 1 Drawing Sheet

PROCESS FOR THE PRODUCTION OF COMPOSITE MOLDED ARTICLES

This application is continuation-in-part of copending application U.S. Ser. No. 07/552,688 filed on Jul. 12, 1990, now abandoned.

BACKGROUND OF THE INVENTION

Field of the Invention

The present invention relates to a process for the production of composite molded articles. More particularly, it relates to a process for the production of integrated composite molded items which comprises (i) a surface portion composed of a synthetic resin phase containing a fibrous reinforcing material, (ii) a foam-like core portion made of the synthetic resin phase containing a plurality of foamed or hollow particles and (iii) a separation layer arranged between the core portion and the surface portion.

Composite molded items whose core portion has a foamed core and whose surface portion is constructed by a fiber-reinforced resin exhibit excellent lightweight property and toughness and therefore they are put into practice in various fields and further improved molded items and process for their productions have been proposed.

DESCRIPTION OF THE RELATED PRIOR ART

Known processes for the production of molded items having the above-described construction include, for example, a process including steps of forming a foamed core for a core portion in advance, wrapping molded item with a woven cloth as a reinforcing material, placing the wrapped item in a mold, injecting a liquid molding resin into the mold to form a surface portion and then taking out the resulting composite molded item from the mold, and a process including the steps of preforming a member having a cavity and serving as a surface portion in advance, injecting an expandable polyurethane with a forming agent or the like in the cavity to form therein foam core portion to obtain a composite molded item. Hereafter, concrete explanation will be made.

(i) Japanese Laid-Open Patent Publication (Kokai) No. 162207/1988 (corresponding to European Patent Application No. 0272359) discloses a process for the production of a molded item which comprises the steps of preforming a thermoelastic rigid foam into a predetermined shape, wrapping the preformed foam with a woven cloth to give a preformed foam core, placing the preformed foam core in a mold having inner confining surfaces which serves to form therealong a contour of a finally obtained member and which can heat a specified portion of the core, injecting a liquid, thermosetting moldable resin into the mold, heating the mold to expand the foam core to allow the woven cloth wrapping the foam core to compress against the inner confining surfaces of the mold due to force of expansion of the foam and curing the resin to obtain a molded item. Although it has a feature that it can produce lightweight, tough composite molded items which have not been obtained by the conventional processes, the process referred to above has various limitations, for example, that (a) the foam core to be preformed must have a shape as close as possible to that of the mold, (b) as for the quality of the foam core, the foam core must be selected from those having a temperature of thermal expansion in a proper range, and (c) the foam core to be used must be closed-cell foams so that no thermosetting resin penetrates in the cavity thereof.

(ii) Japanese Patent Publication (Kokoku) No. 39107/1975 discloses a process for the production of an unsaturated polyester form including the steps of providing a resin composition comprising an unsaturated polyester resin, microcapsules composed of a thermoplastic synthetic resin capable of being expanded at a temperature no lower than its softening point due to volume expansion of a substance contained therein to thereby forming expanded microballoons, a polymerization initiator, and one or more optionally added additives; heating the resin composition at a temperature no lower than that at which the microcapsules are fully expanded to form balloons, and curing by heating the composition before the balloons are broken. This process uses microcapsules which can form microballoons as the result of volume expansion and cures the unsaturated polyester while allowing the microcapsules to expand in it. The molded item obtained contains the foamed microballoons dispersed in the resin throughout and therefore the molded item has only insufficient strength.

(iii) Japanese Laid-Open Patent Publication (Kokai) No. 15835/88 discloses a process for the production of an foamed polymer comprising the steps of providing a blend of a heat-crosslinkable polymer with a heat-expandable microspheres, heating the blend to become a foamed mixture due to the expansion of the microspheres, and then crosslinking in a mold or the like.

More specifically, the process comprises blending a heat-crosslinkable polymer such as rubber, polyurethane, epoxy resin or phenol resin with expandable microspheres, expanding the microspheres in advance to obtain prefoamed product, press molding the prefoamed product in a mold to obtain compressed crosslinked molded items. The molded items obtained contains expanded microspheres dispersed therein throughout.

(iv) Japanese Laid-Open Patent Publication (Kokai) No. 55966/73 discloses a process for the production of a foamed thermosetting synthetic resin comprising the steps of forming microcapsules from a thermoplastic synthetic resin composition which can be converted to microballoons as the result of volume expansion of a substance contained therein at a temperature no lower than the softening point of the resin, adding the microcapsules to a thermosetting synthetic resin and mixing the components, expanding the microcapsules in a molding step while curing the resin.

The molded item obtained by the process contains expanded micro hollow particles dispersed therein throughout.

(v) Japanese Laid-Open Patent Publication (Kokai) No. 58062/73 (corresponding to U.S. Pat. No. 3,842,020) discloses a process for the production of a thermo-set synthetic resinous resol foam, comprising the steps of providing an intimate mixture of a resol resin and a catalyst for the resol resin, confirming the mixture with a mold having a desired shape, and curing the resin, wherein prior to charging the mixture in a cavity of the mold, a number of expandable microspheres of a thermoplastic synthetic resin in which microspheres a volatile liquid blowing agent is included are incorporated in the mixture, and the resulting mixture is cured at a temperature at which the expandable microspheres cause their expansion.

Molded items obtained by this process, like the ones described in (iv) above, contain expanded microspheres dispersed therein throughout.

(vi) Japanese Utility Model Publication (Kokoku) No. 24521/87 proposes a lightweight molded product comprised by a fiber-reinforced unsaturated polyester resin, which comprises two surface layers made of a fiber-containing unsaturated polyester resin, and a core layer containing a number of expanded particles of a polyolefin type resin or ground product thereof and being formed integrally between the two surface layers.

The lightweight molded product is obtained by a process comprising the steps of placing glass fiber in a mold, covering the glass fiber with an aliquot of a stock solution of an unsaturated polyester resin to form a surface layer, casting into the mold a mixture of expanded particles of a polyolefin resin and another aliquot of the stock solution of the unsaturated polyester resin to form a core layer, covering a glass fiber-containing unsaturated polyester resin thereon to form another surface layer, clamping the mold, and then curing the resin.

As described above, this process uses already expanded particles, which makes it difficult to uniformly apply pressure onto the surface layers throughout upon molding. Therefore, it is uneasy to obtain molded products having uniform quality stably by the process. In addition, although it is suitable for obtaining board type molded items in which an unsaturated polyester resin containing expanded particles is present as a core between the overlying and underlying surface layers, the above described process is unsuitable as a process for the production of molded materials having a curved surface.

The above-described prior arts are disadvantageous because they have defects that (i) they involve complicated steps and troublesome operations for obtaining composite molded items, resulting in that the production efficiency of the molded items is low and high cost is incurred; (ii) the composite molded items obtained have unsatisfactory strength and appearance; or (iii) the shape or size of the composite molded items are limited.

Therefore, it is a first object of the present invention to provide a process for the production of a composite molded item, which enables one to obtain by relatively simple operations a composite molded item composed substantially of a surface portion and a center portion (core portion) containing bubble-containing particles such as foamed resinous microspheres or hollow beads.

It is a second object of the present invention to provide a process for the production of a composite molded item, which enables one to obtain the composite molded item having the above-described construction substantially in a single step without resort to troublesome operations and complicated conditions.

Another object of the present invention is to provide a process for the production of a composite molded item, which process has an excellent production efficiency, particularly a high productivity of a molded item per molding equipment.

Still another object of the present invention is to provide a process for the production of a composite item which is light in weight, and which had a structure having a high physical strength and excellent appearance.

Yet another object of the present invention is to provide a process for the production of a composite molded item, which process permits free selection of the shape and size of the item.

Other objects and features of the present invention will be apparent from the following description.

SUMMARY OF THE INVENTION

As the result of intensive investigation by the present inventors, it has now been found that the above-described objects and features of the present invention can be achieved by a process for the production of an integral composite molded item comprising (i) a surface portion comprising a synthetic resin phase containing a fibrous reinforcing material, (ii) a core portion comprising the synthetic resin phase containing bubble-containing particles, such as foamed resinous particles or hollow beads, and (iii) a separation layer positioned between the surface portion and the core portion, the process comprising the steps of:

(a) providing in a substantially sealed mold a separation layer which does not substantially pass therethrough expandable particles or compressed lightweight particles of an elastic material but which is capable of passing a synthetic resin or its precursor that is liquidized at the time of molding;

(b) providing the synthetic resin or its precursor in the mold;

(c) arranging a fibrous reinforcing material between the separation layer and the mold, integrated with the separation layer or separately but associated therewith;

(d) providing an aggregate of the expandable particles and/or compressed particles of the lightweight elastic material on a side of the separation layer opposite to the side of an inner surface of the mold;

(e) causing volume expansion of the aggregate by elevation of temperature to thereby expand the expandable particles or relieving compression urged on the compressed lightweight particles to thereby expand the lightweight particles;

(f) flowing the liquidized synthetic resin or its precursor through the separation layer to spread it over between the separation layer and the mold and among the expanded particles, or among the particles of the lightweight elastic material, while pressing the separation layer onto the inner surface of the mold as the result of volume expansion in the step (e) above;

(g) completing formation-solidification or solidification of the synthetic resin to form a surface portion and a core portion; and (h) taking out the resulting composite molded item.

DESCRIPTION OF PREFERRED EMBODIMENTS

Figure 1:
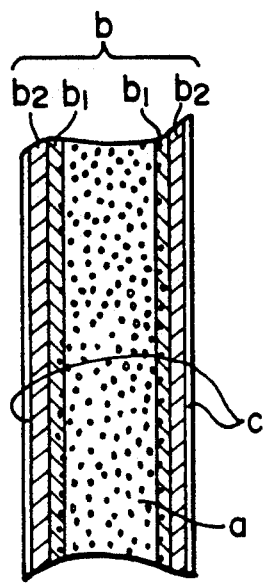
FIG. 1 is a schematic cross-sectional view illustrating the arrangement the separation layer and the fibrous reinforcing material in the planer molded item produced by the process according to an embodiment of the present invention.

The above-described process of the present invention has a feature that expansion of the expandable particles by temperature elevation or relief of the compression of the compressed particles of the lightweight elastic material is allowed to occur within the mold, thereby causing volume expansion of the aggregate of the particles, and the force generated by the volume expansion is utilized as much as possible and most efficiently.

In other words, the force generated by the volume expansion of the aggregate of particles directly acts as a force which is applied to the separation layer surrounding the aggregate to be pressed outwardly onto the inner surface of the mold and also as a force which is urged onto the expanded particles or particles of the lightweight elastic material which have been relieved of compression applied thereto in the separation layer to bring them closer to each other to form a dense core portion. Furthermore, as the result of the volume expansion of the aggregate of the particles, the synthetic resin or its precursor in a fluid state travels through the separation layer to penetrate into the fibrous reinforcing material and/or aggregate of the particles sufficiently, thereby realizing the foramtion of dense surface portion and foam-like core portion.

Thus, according to the process of the present invention, composite molded items can be obtained which have the following characteristics.

(i) The surface portion which comprises the synthetic resin containing the fibrous reinforcing material can be formed uniformly and densely all over the surface of the molded items. Practically no particles are present in the surface portion.

(ii) Because there is substantially no expanded particle or lightweight particle of the elastic material in the surface portion, the surface portion formed has a dense structure and the molded items obtained have a high physical strengths and excellent appearance.

(iii) The inner core portion in which the particles and the synthetic resin are packed without gaps between each other is formed. The separation layer is located between the core portion and the surface portion.

(iv) The circulation of the fluid synthetic resin or its precursor through the separation layer in the sealed mold forms the surface portion and the core portion and therefore the surface portion and the core portion together form a structure firmly integrated with each other by the communication of the same synthetic resin.

The process for the production of a composite molded item according to the present invention can be employed regardless of whether or the synthetic resin used is a thermosetting resin or a thermoplastic resin, and whether the bubble-containing particles such as foamed resinous particles, hollow beads or expanded microballoon in the core portion are of the type of expanded particles or that of particles of the lightweight elastic material of which compression has been relieved.

The molding process of the present invention includes the following molding processes A, B and C depending on the selection and combination of the type of the above-described resin and that of the air bubble-containing particles.

Molding Process A

A process for the production of an integral composite molded item comprising
(i) a surface portion comprising a synthetic resin phase containing a fibrous reinforcing material,
(ii) a core portion comprising the synthetic resin phase containing bubble-containing particles, and
(iii) a separation layer positioned between the surface portion and the center portion, the process comprising the steps of:
 (a) providing in a substantially sealed mold a separation layer which does not substantially pass therethrough expandable particles but which is capable of passing a thermosetting resin as or its precursor that is liquidized at the time of molding;
 (b) providing the thermosetting resin or its precursor in the mold;
 (c) arranging a fibrous reinforcing material between the separation layer and the mold, integrated with the separation layer or separately but associated therewith;
 (d) providing an aggregate of the expandable particles on a side of the separation layer opposite to the side of an inner surface of the mold;
 (e) causing volume expansion of the aggregate by elevation of temperature to thereby expand the expandable particles;
 (f) flowing the thermosetting resin or its precursor through the separation layer to spread it over between the separation layer and the mold, and among the expanded particles, while pressing the separation layer onto the inner surface of the mold as the result of volume expansion in the step (e) above;
 (g) curing thermosetting resin or its precursor to complete solidification thereof to form a surface portion and a core portion; and
 (h) taking out the reuslting composite molded item.

Molding Process B

A process for the production of an integral composite molded item comprising
(i) a surface portion comprising a synthetic resin phase containing a fibrous reinforcing material,
(ii) a center portion comprising the synthetic resin phase containing bubble-containing particles, and
(iii) a separation layer positioned between the surface portion and the core portion, the process comprising the steps of:
 (a) providing in a substantially sealed mold a separation layer which does not substantially pass therethrough compressed lightweight particles of an elastic material but which is capable of passing a thermoplastic resin or the thermosetting resin that is liquidized at the time of molding;
 (b) providing the thermoplastic resin or the thermosetting resin in the mold;
 (c) arranging a fibrous reinforcing material between the separation layer and the mold, integrated with the separation layer or separately but associated therewith;
 (d) providing an aggregate of the compressed particles of the lightweight elastic material on a side of the separation layer opposite to the side of an inner surface of the mold;

(e) causing volume expansion of the aggregate by relieving compression urged on the compressed lightweight particles to thereby expand the lightweight particles;

(f) flowing the liquidized resin through the separation layer to spread it over between the separation layer and the mold, and among the particles of the lightweight elastic material themselves while pressing the separation layer onto the inner surface of the mold as the result of volume expansion in the step (e) above;

(g) completing solidification of the resin to form a surface portion and a center portion; and (h) taking out the reuslting composite molded item.

Molding Process C

A process for the production of an integral composite molded item comprising (i) a surface portion comprising a synthetic resin phase containing a fibrous reinforcing material, (ii) a center portion comprising the synthetic resin phase containing bubble-containing particles, and (iii) a separation layer positioned between the surface portion and the core portion, the process comprising the steps of:

(a) providing in a substantially sealed mold a separation layer which does not substantially pass therethrough expandable particles but which is capable of passing a thermoplastic resin that is molten at the time of molding;

(b) providing the thermoplastic resin in the mold;

(c) arranging a fibrous reinforcing material between the separation layer and the mold, integrated with the separation layer or separately but associated therewith;

(d) providing an aggregate of the expandable particles on the side of the separation layer opposite to the side of an inner surface of the mold;

(e) causing volume expansion of the aggregate by elevation of temperature to thereby expand the expandable particles;

(f) flowing the molten thermoplastic resin through the separation layer to spread it over between the separation layer and the mold, and among the expanded particles themselves while pressing the separation layer onto the inner surface of the mold as the result of volume expansion in the step (e) above; (g) completing solidification of the thermoplastic resin to form a surface portion and a center portion; and (h) taking out the resulting composite molded item.

Next, the molding process of the present invention will be explained in greater detail below.

The molding process of the present invention is carried out practically in a single step in a substantially sealed mold. In this case, any type of molds can be used as far as they can substantially be sealed hermetically at the time of molding and endure the molding pressure and temperature. Generally, those types of molds which are used in conventional molding methods such as RTM method (Resin Transfer Molding method), and RIM method (Reaction Injection Molding method) can be used in the process of the present invention. Any of metal molds, wood molds or resinous molds may be used.

As described earlier, the advantages of the molding process of the present invention are achieved by expansion of the expandable particles or relief of compression urged on the particles of the lightweight elastic material to effect volume expansion of the aggregate of the particles and utilizing as much as possible and most efficiently the force of expansion by the use of the separation layer.

Therefore, the use of the separation layer is indispensable for achieving the objects of the present invention.

Accordingly, the separation layer used in the present invention must be one which does pass therethrough substantially no expandable particles nor compressed particles of the lightweight elastic material but which is capable of passing therethrough the synthetic resin or its precursor.

Another desired performance of the separation layer is that it can endure pressure generated as the result of volume expansion of the aggregate of the particles. If the separation layer is broken or holes are made therein as the result of volume expansion and the particles expanded or the particles of the lightweight elastic material pass the separation layer, it will be difficult to obtain the objective composite molded items.

In order to achieve the above-described performance, the mesh size or diameter of holes of the separation layer should be selected depending upon the size and shape of the expandable particles or the particles of the lightweight elastic material in a compressed state.

When the separation layer which can pass the expandable particles or the compressed particles of the lightweight elastic material is used, the surface portion of the molded item contains bubble-containing particles, and as the result the composite molded item obtained fails to exhibit satisfactory strength or has a poor appearance, and therefore its commercial value is low.

Specific examples of the material for preparing the separation layer include woven fabrics, knitted fabrics, unwoven fabrics, webs, paper, wire gauzes, and porous films. Of these, preferred are woven fabrics, knitted fabrics, unwoven fabrics and webs. The material therefor may be any of synthetic fibers, natural fibers metal fibers or the other inorganic fibers.

The structure of the separation layer is desirably such that substantially none of the expandable particles nor the compressed particles of the elastic material can pass it. That is, the structure of the separation layer is determined depending on the structure of the mold to be used for molding and the structure and shape of the objective composite molded item. Generally, the separation layer is of a bag-like or planar structure. The bag-like structure is particularly preferred. The bag-like or planar structure does not have to be a separation layer entirely. Instead, a portion of the structure may be constituted by other materials such as films and membranes unless the resulting structure shows substantial passing therethrough of the expandable particles or compressed particles of the lightweight elastic material and unless the object of the present invention is injured.

In the molding process of the present invention, the separation layer may be a structural material which is integrated with the fibrous reinforcing material that forms the surface portion. The use of such integrated structural material is a preferred embodiment of the present invention. A typical example of the integrated structural material is a fibrous reinforcing material which has a function of the separation layer at least on its surface portion.

Although detailed explanation on the fibrous reinforcing material will be made later on, it should be noted here that when this type of the reinforcing material is selected from, for example, woven fabrics, knitted fabrics, unwoven fabrics or webs, the reinforcing material itself have a function of the separation layer and therefore it can be used also as the separation layer if it does not pass therethrough the expandable particles or compressed particles of the lightweight elastic material on its inner surface portion (i.e., the surface which the expandable particles or the compressed particles of the lightweight elastic material contact). In case of using such bifunctional fibrous reinforcing material is used, it is not always necessary to provide a separation layer independently. However, the separation layer and the fibrous reinforcing material may be used separately in association with each other or integrally as being laminated one on another.

As the fibrous reinforcing material for forming the surface portion of the composite molded item of the present invention, those fibrous reinforcing materials can be employed which are generally used for fiber-reinforced plastics. Preferred examples of such reinforcing material include glass fiber, carbon fiber, silicon carbide fiber, metal fiber, aramide fiber, polyarylate fiber, high-strength polyolefin fiber and mixtures of two or more of them. Besides these fibers, polyester fiber, nylon fiber, viscose fiber, natural fibers, or asbestos may be used. The fibers may be short fibers or long fibers, or whiskers.

It is preferred to use the fibrous reinforcing materials generally as a material having a fibrous structure. That is, the reinforcing material may advantageously be woven fabrics (plain weave fabrics, cord fabrics, twill fabrics, etc.), knitted fabrics, unwoven fabrics, UD filaments (unidirectionally oriented filaments) or fibrous webs.

Although it is unsuitable to use it in itself as a reinforcing material in the surface portion, the short fiber or whisker (for example, silicon carbide whisker, carbon whisker, silicon nitride whisker, etc.) can be used in the form of a portion of a fibrous web or unwoven fabric.

In the composite molded item of the present invention, the bubble-containing particles contained in the core portion are formed by expanding the expandable particles or relieving compression applied to the particles of the lightweight elastic material during the molding. Description on the particles will be made in detail below.

As the above-described expandable particles, there can be used those particles which can undergo volume expansion due to heating upon molding and which can substantially retain bubbles as included in the particles after the expansion. Those whose volume increase amounts at least about 10%, and preferably at least about 20% are used as expandable particles. The expandable particles now available undergo volume expansion of usually from about 20% to about 70 times the original volume. In this case, the magnification of volume expansion means volume expansion magnification measured when the expandable particles are expanded at a predetermined molding temperature at atmospheric pressure but it does not always indicate a volume expansion magnification of a composite molded item actually obtained by molding.

The expandable particles have a mean particle size preferably in the range of from about 1 μm to about 5 mm, and more preferably about 10 μm to about 1 mm. The polymer which constitutes the above-described expandable particles undergoes volume expansion when heated upon molding and thus substantially include bubbles therein and in addition does not flow at heating temperature upon the molding. Generally preferred expandable particles are formed from polyvinylidene chloride copolymer, polystyrene or polystyrene copolymer, polyolefin, polyphenylene oxide copolymer or a blend of polyphenylene oxide and polystyrene, and contain therein blowing agent. In particular, it is desirable to use polyvinylidene chloride particles containing a low boiling point hydrocarbon which can vaporized and form expanded microballoons when heated. Such particles are commercially available under trade names such as EXPANCEL (for a product by Nobel Ind.), MATSUMOTO MICROSPHERE (for a product by Matsumoto Yushi Seiyaku Co., Ltd.), ESLENE BEAD (for a product by Sekisui Kaseihin Co., Ltd.) and the like, which can be used as they are.

On the other hand, suitable particles of the lightweight elastic material are those which have a mean particle size of from about 50 μm to about 10 mm, and preferably about 500 μm to about 5 mm in a uncompressed state (at atmospheric pressure). As the particles of the lightweight elastic material, those particles can be used which recover their volume relative the original volume to a level of from about 10% to about 100%, and preferably from about 20% to about 60%.

Preferred examples of the polymer which constitutes the particles of the lightweight elastic material include polyolefin, polyurethane, and natural or synthetic rubber. Such particles of the lightweight elastic material are commercially available under trade names such as POLYPROPYLENE BEAD (e.g., PB-MG15P, for a product by JSP Co.), which can be used as it is.

The aggregate of the expandable particles and that of the particles of the lightweight elastic material described above may be used as a mixture with non-expandable foamed or expanded particles which undergoes substantially no volume expansion by heating or relief of compression. The non-expandable particles must be those which do not pass the separation layer in substance. The use of the non-expandable particles as mixed with the aggregate of the above-described particles facilitates operations of molding and gives a composite molded item which has more excellent toughness and rigidity.

The above-described non-expandable particles may be either inorganic expanded hollow particles, such as inorganic microballoons, or organic expanded particles. Generally, inorganic expanded particles are preferred. Specific examples of the non-expandable inorganic expanded particles include glass balloons, silica balloons, and shirasu balloons (volcanic white sand balloons). Their mean particle size is preferably from about 1 μm to about 1 mm, and more preferably from about 5 μm to about 0.5 mm. Mixing ratio of the expandable particles or the particles of the lightweight elastic material to the non-expandable expanded particles is preferably from 10:1 to 1:5, and more preferably from 9:1 to 1:3, by weight.

Further, according to the studies by the inventors, it has been found that the process for the production of integrated composite molded items of the present invention is suitable for recycling used resin molded items with decreased value of use.

That is, in the process of the present invention, it is possible that the crushed products of used resin molded items or the like with decreased value of use are molded together with said materials for the molding of the present invention to obtain composite molded items integrated with the crushed products.

Thus, the process of the present invention is valuable as a technique of recycling resin molded items wasted in a great amount after durable years or with decreased functions as parts of composite molded items. Accordingly, the process of the present invention is significant from the standpoint of effective utilization of sources, problems of the circumstances of the earth and the like.

Hereinafter, the process of the present invention in case of recycling the used resin molded items will be described.

According to the process of the present invention, the crushed products of used resin molded items are provided, together with, preferably mixed with, an aggregate of the expandable particles and/or compressed particles of the lightweight elastic material on a side of the separation layer opposite to the side of an inner surface of the mold, in step (d).

Thus, in case that the process of the present invention is performed in order to recycle used resin molded items, only step (d) of said steps (a)–(h) is changed to step (d') below and other steps are not changed substantially to obtain similar integrated composite molded items.

step (d'):
(d) providing an aggregate of the expandable particles and/or compressed particles of the lightweight elastic material together with crushed products of used resin molded items on a side of the separation layer opposite to the side of an inner surface of the mold;

In said step (d'), crushed products to be used are preferably solid in a dry state at normal temperatures and indecomposable at temperature below 100° C. More preferably, they are stable at molding temperatures. Though contingent upon the shapes of used resin molded items, in case of relatively large molded items, they are used after being crushed into gravel or sand by a crusher. Regarding the size of crushed products, the maximum size (the maximum diameter) is preferably smaller than the maximum thickness of a molded item to be made. Preferable average size is about 1-5 mm.

As materials constituting used molded items to be used after being crushed, there can be mentioned, for example, rubbers, plastics, mixtures of metals and plastics, mixtures of inorganic matters and plastics and fiber-reinforced resins. Especially preferable is a composite molded item having a foamed core for a core portion. Above all, since the integrated composite molded items obtained by the process of the present invention are lightweight, they can be recycled after being crushed, which is more preferable.

Thus, the process of the present invention can be said to be a process suitable for recycling, since lightweight molded items obtained by the process can be used advantageously after being used.

In step (d'), the compounding proportion of crushed products depends on kinds and density of crushed products, density or toughness of objective molded items or moldability. Generally, the weight ratio of [crushed products] and [the total of expandable particles or compressed lightweight elastic particles and synthetic resins (or their precursors) or thermosetting resins (or their precursors)] is in the range from 10:90 to 90:10, preferably from 30:70 to 70:30.

The synthetic resin which can be used in the surface portion and the core portion in the production of the composite molded item of the present invention may roughly be classified into a thermosetting resin and a thermoplastic resin. These resins including their precursors may be the one generally used as a molding resin as far as they can each be liquidized or show fluidity at the time of molding. The thermosetting resin or its precursor is the one which cures as the result of the molding due to polymerization reaction and/or cross-linking reaction to give rise to a solid resin. Generally, the one which is liquid at room temperature is advantageous. By the term "precursor" is meant a monomer and prepolymer. Specific examples of the thermosetting resin include epoxy resins, polyurethane resins, unsaturated polyester resins, polyvinyl ester resins, polyimide resins, and polyamide resins. Of these, preferred are epoxy resins, polyurethane resins, unsaturated polyester resins and polyvinyl ester resins. If desired, curable polycycloolefin resins such as dicyclopentadiene resin may also be used.

Usually, thermosetting resins are employed as a mixture of the resin or its precursor with a curing agent and/or a promotor. In this invention, it is possible to use them in combination and it is more advantageous to do so.

On the other hand, any conventional thermoplastic resins that are usually used for molding can be used as far as they are molten and flow at a molding temperature. It is desirable to use those thermoplastic resins which show fluidity at a temperature in the range of from about 70° C. to about 230° C., and preferably in the range of from about 80° C. to about 200° C.

Specific examples of the thermoplastic resin include polyolefins (for example, polyethylene and polypropylene), polystyrenes, crystalline liquid polyallylate resins, phenoxy resins, polyvinyl chlorides, nylon and polyoxyalkylenes. Of these, preferred are polyolefins, polystyrenes, crystalline liquid-polyallylate resins and phenoxy resins are preferred. If desired, prepolymers which can be converted into thermoplastic resins can also be used.

Upon practicing the molding process of the present invention, at first the fibrous reinforcing material is arranged along the inner surface of the mold, and the separation layer is provided on the inner side thereof. When the separation layer and the fibrous reinforcing material are integrated with each other, and typically when the fibrous reinforcing material which has a function of the separation layer simultaneously is used, the integrated material may be arranged all over the inner surface of the mold, with the surface having a function of the separation layer being directed inwards.

How to arrange the separation layer and the fibrous reinforcing material depends on the shape, size, physical properties and utility of the objective composite molded item.

As described earlier, the molding process of the present invention, during the molding step, effectively utilizes volume expansion of the aggregate of the expandable particles or the compressed particles of the lightweight elastic material and accordingly the separation layer and the fibrous reinforcing material should be arranged so that the aggregate of the particles can press the separation layer all over the inner surface of the mold when volume expansion thereof occurs.

Needless to say, the separation layer must be arranged in accordance with the shape of the mold so that bubble-containing particles can be prevented from contaminating the surface portion of the composite molded item. Even if the separation layer had a property substantially not allowing the expandable particles or the compressed particles of the lightweight elastic material to pass therethrough, incomplete arrangement of the separation layer in the mold could cause movement or transfer of the particles from a portion of its periphery toward the surface portion. This is undesirable and should be avoided.

Figure 2:
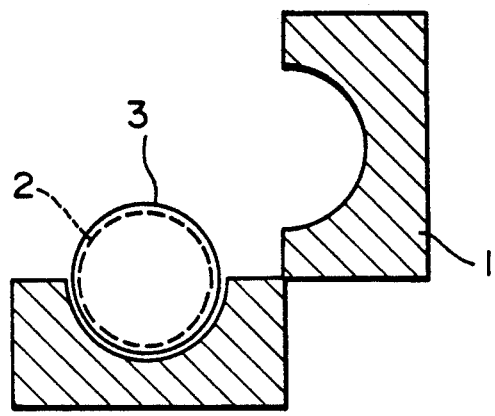
FIGS. 2 and 3 each is a schematic cross-sectional view of the mold used in the process of the present invention, in which the separation layer and the fibrous reinforcing material are arranged.
Figure 3:
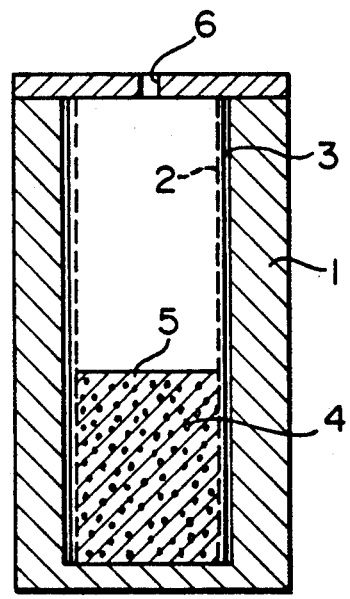

For example, when it is desired to produce rod-like or cylindrical molded items, it is sufficient to arrange on the inner surface of the mold the separation layer and the fibrous reinforcing material in the form of a bag-like structure (hollow cylinder) in response to the desired shape of the molded items. FIGS. 2 and 3 attached hereto schematically illustrate this type of arrangement. On the other hand, if it is contemplated to produce planar molded items, it is sufficient to arrange the separation layer and the fibrous reinforcing material all over the inner surface of the mold. In this case, the separation layer may be of a bag-like structure. FIG. 1 shows an example of the arrangement of the separation layer and the fibrous reinforcing material in the mold in the case of producing the planar molded item.

When producing planar molded items or flatones with front and back faces, the separation layer may be arranged only on one side of the inner surface of the mold. In this case, the other side may be free without providing a separation layer, may have, instead of the separation layer, a material such as a film which does not pass therethrough even the liquid molding resin, or may have a separation layer, and selection may be made properly depending on the purpose, for example, when the production of cowling for motorcycles is desired, the operations of coating the front face and affixing a dechalcomanie pattern thereto can be simplified by arranging a printed film on the side of the front face and using a separation layer of woven fabric of glass fiber on the side of the back face. In the case where it is desired to produce a plate as a structural material which requires a high rigidity, a separation layer may be provided on each face and a fibrous reinforcing material may be arranged between each separation layer and the inner surface of the mold.

As described earlier, after arranging the separation layer and the fibrous reinforcing material in the mold, the expandable particles and the lightweight elastic particles are provided on the separation layer on a side opposite to the side of the inner surface of the mold, or when a bag-like structure is used as the separation layer, in the inside of the bag-like structure. In particular, when a bag-like structure is used as the separation layer, the expandable particles or the particles of the lightweight elastic material may be introduced in the inside of the bag-like structure in advance outside the mold.

The aggregate of the expandable particles is, as stated before, a mass of small particles and has in itself humidity, therefore, it can be supplied by injecting through a pipe into the mold after closing it. However, care must be taken when supplying the aggregate of the particles into the mold through a thin communication pipe by stable operation. Usually, it is desirable to introduce the expandable particles or the particles of the lightweight elastic material into the mold before closing the mold.

In the composite molded item of the present invention, the component which constitutes the synthetic resin, i.e., thermoplastic resin or thermosetting resin or their precursors (hereafter, sometimes referred to generally as "synthetic resin component") can be arranged in or supplied into the mold by various methods.

Roughly speaking, they may be classified into the following groups.
(1) A method in which the synthetic resin component is mixed with or impregnated to the separation layer or the fibrous reinforcing material.
(2) A method in which the synthetic resin component is mixed with or impregnated to the aggregate of the expandable particles or of the particles of the lightweight elastic material.
(3) A method in which the synthetic resin component is poured into the mold after closing it.

The methods (1) to (3) may be used singly or any desired combination of two or more of them may be used.

Which of the methods (1) to (3) is to be adopted depends on the type of the synthetic resin, in particular whether it is a thermoplastic resin or a thermosetting resin.

When the thermosetting resin or its precursor is liquid at room temperature, the methods (1), (2), (3) and combinations thereof may be adopted. However, the methods (2) and (3) may be advantageous. In the method (1), it is advantageous that a thermosetting resin or its precursor which is liquid is impregnated in the separation layer and the fibrous reinforcing material, mainly in the fibrous reinforcing material, in advance, and then the impregnated layer and material are arranged in the mold, and then the expandable particles or the particles of the lightweight elastic material are arranged in the mold, followed by closing it and elevation of the temperature thereof. In this case, a portion of the thermosetting resin or its precursor moves from in the fibrous reinforcing material through the separation layer to the aggregate of the particles where it is impregnated, as the result of expansion of the expandable particles or relief of compression of the compressed particles of the lightweight elastic material so that the synthetic resin component spreads all over in the mold.

On the other hand, when the thermosetting resin or its precursor is solid at room temperature but becomes fluid at a predetermined molding temperature, the methods (1), (2) or combination thereof may be adopted. Concrete example of one of the methods which can be adopted is a method in which solid powder of the thermosetting resin or its precursor is mixed with the expandable particles or the particles of the lightweight elastic material in advance, and the resulting mixture is arranged at a predetermined position prior to molding. In this method, heating of the mold renders the resin component fluid, and according as the aggregate of the particles undergoes volume expansion a core portion is formed and at the same time a portion of the particles flows passing through the separation layer to the fibrous reinforcing material for a surface portion.

According to another improvement of this method, a solid integrated intermediate product composed of the above-described resin component as a matrix and the expandable particles dispersed in the matrix is prepared in advance outside the mold, which intermediate product is used as the mixture of the expandable particles with the resin. The integrated solid mixture is arranged at a predetermined position in the mold, followed by closing and heating it to render the matrix resin component in the solid mixture fluid, and a core portion is formed simultaneously with the expansion of the expandable particles. A portion of the resin component passes through the separation layer and flows into the fibrous reinforcing material to form a surface portion.

This improved method can be practiced not only using the expandable particles but also employing the particles of the lightweight elastic material similarly. More specifically, a solid integrated intermediate product composed of the above-described resin component as a matrix and compressed particles of the lightweight elastic material dispersed in the matrix is prepared in advance outside the mold, which intermediate product is used as the mixture of the particles of the lightweight elastic material with the resin. The integrated solid mixture is arranged at a predetermined position in the mold, followed by closing and heating the mold to render the matrix resin component in the solid mixture fluid to thereby relieving the compression applied to the particles of the lightweight elastic material, resulting in volume expansion. In accordance therewith a core portion is formed, and a portion of the resin component passes through the separation layer and flows into the fibrous reinforcing material to form a surface portion.

When the synthetic resin component is a thermoplastic resin, the methods (1) or (2), particularly preferably the method (2), can be adopted. More specifically, the method (2) is a method which is basically the same with the above-described method in which the thermosetting resin or its precursor which is solid at room temperature and which can be rendered fluid at a molding temperature is used as the synthetic resin component. That is, one of them is a method in which solid powder of a thermoplastic resin (the one which is capable of being rendered fluid at a molding temperature) is mixed with the expandable particles or the particles of the lightweight elastic material in advance, and the resulting mixture is arranged at a predetermined position in the mold, and another improved method is the one in which an integrated solid intermediate product is prepared in advance outside the mold which intermediate product contains a thermoplastic resin component as a matrix and the expandable particles dispersed in the matrix, and this intermediate product is utilized. Still another improved method is the one in which an integrated solid intermediate product is prepared in advance outside the mold which intermediate product contains a thermoplastic resin component as a matrix and the compressed particles of the lightweight elastic material dispersed in the matrix, and this intermediate product is utilized.

The amounts and proportions of the separation layer, fibrous reinforcing material, synthetic resin component, expadable particles or particles of the lightweight elastic material which are charged in the mold, may be varied in a wide range depending on the properties and utilities of the objective composite molded items. However, what is necessary is that the amounts of the respective components in the mold are such that at the time of molding cavity do not exist after volume expansion of the aggregate of the expandable particles or the particles of the lightweight elastic material.

In particular, it is desirable to use upon proper selection the separation layer, fibrous reinforcing material, synthetic resin component, expandable particles or particles of lightweight elastic material and other additives so that the composite molded item of the present invention may have one of the following compositions a) to e).

a) In a substantial portion where a core portion is present in the composite molded item, the core portion occupies from about 30% to about 95% by volume, and preferably from about 40% to about 90% by volume.

b) The specific density at the core portion is from about 0.05 to about 0.8 g/ml, and preferably about 0.1 to 0.6 g/ml.

c) The proportion of the synthetic resin in the core portion is from about 15 to 70% by volume, and preferably from about 20 to 50% by volume.

d) In the surface portion, the total amount of the fibrous reinforcing material and the separation layer occupy from about 30 to 80% by volume, and preferably from about 30 to 60% by volume.

e) In the surface portion, there is substantially no expanded particle nor particle of the lightweight elastic material.

In the molding method of the present invention, as described earlier, each of components is charged in the mold and the mold is heated from outside, or when a thermosetting resin is used which generates heat upon its curing, the temperature of the mold is elevated by the heat generation at the time of curing or both to firstly expand the expandable particles or to relieve the compression applied to the particles of the lightweight elastic material in order to cause volume expansion of the aggregate of the particles. When an integrated intermediate product comprising a synthetic resin matrix and the particles dispersed in the matrix, the matrix component is rendered fluid to cause volume expansion of the aggregate of the particles.

In this case, while volume expansion of the aggregate of the particles is taking place, at least the synthetic resin component must retain its fluidity. Thus, as the result of volume expansion of the aggregate of the particles, the separation layer is pressed in a direction toward the inner surface of the mold and at the same time the flow of the synthetic resin component takes place from the inside (core portion) to the outside (inner surface of the mold) through the separation layer, or from the outside to the inside.

As the result, a dense surface portion is formed and a core portion composed of the expandable particles or particles of the lightweight elastic material and the synthetic resin is also formed, and the surface portion and the core portion are communicated by the same synthetic resin through the separation layer to obtain a firmly integrated composite molded item.

On the other hand, upon molding, excess of the synthetic resin component is accumulated in a pool in the mold or drawn out through a vent, and then the synthetic resin is cured or cooled to solidify it. Then the mold is opened and the composite molded item thus formed is taken out of the mold by a conventional technique, followed by finishing, if desired, to obtain a final product. The composite molded item thus obtained may be post-cured in an oven.

In the process of the present invention, the core may contain a reinforcing short fiber such as shortcut fiber or whiskers, pre-formed lightweight material, for example, a pre-formed foam, or other additives.

As stated in the foregoing, the present invention can give rise to composite molded items which are light in weight and have a high toughness substantially in a single step.

According to the present invention, lightweight, tough composite sandwiched core molded items can be produced with good productivity at low cost. The composite molded articles thus obtained can be used effectively in a wide range of applications, for example, in the field of sport goods such as canoe paddles, masts, vertical rudders, fins of wind surfing boards (skegs), man-power hydrofoil vessels, ski boards and sticks, hockey sticks, bats for baseball, sporkless wheels, frames of bicycles, and skating boards, in the field of vehicles such as spoilers, drive shafts, interiors and exteriors, of automobiles (cars, buses and trucks), doors and structural materials of transportations, in the field of industrial machiens and devices such as top plates of heat-exchangers, compressor blades for air conditioner, blades of stirrers, electric insulation material support beams, and fittings, in the field of medical apparatus such as wheel chairs (hand rims, side panels), tables for X ray projection, prosthetic hand and feet, and various other utilities including propellers, benches, furniture, controlling surfaces, secondary structural materials, reflectors of antennae for sattelite broad casting.

Hereinafter, this invention will be explained in detail with reference to examples. "Parts" in the examples means parts by weight.

EXAMPLE 1

This is an example for the production of a plate composite sandwiched core molded product according to the process of the present invention.

A "mold" made of a transparent acrylic resin for producing a plate of 160 mm long, 60 mm wide and 3 mm thick (equipped with a vent on the upper part and an inlet for injecting a liquid) was provided. Then, two sets of two woven fabrics of glass fiber (WE-181-100BV, produced by Nittobo Co.), each cut to have a size of 160 mm long and 60 mm wide and have a narrow mesh, were provided and arranged on each inner surface of the mold. After putting the both surfaces together and clamping the mold, a slurry composed of microsheres of vinylidene chloride copolymer (MATSUMOTO MICROSPHERE F-30D produced by Matsumoto Yushi Seiyaku Co.) having a mean particle size of from 10 to 20 m and including therein a low boiling point hydrocarbon which expands upon heating to be converted to microballoons and an epoxy resin (100/31 mixture of EPIKOTE 828/EPOMATE YLH006 produced by Yuka Shell Epoxy Co.) in a weight proportion of 20/20 was injected under pressure into the space between the two sets of the woven fabrics of glass fiber through the inlet at the lower portion of the mold using a syringe to a height of 50 mm from the bottom of the mold. In this case, the vent on the upper portion was kept open.

When the whole mold was dipped in a hot water bath kept at 90° C., volume expansion of the slurry started after about 13 minutes form the dipping, and a small amount of the slurry was spouted out of the vent after 20 minutes from the dipping, which indicated completion of the expansion.

After 50 minutes, the mold was taken out form the bath, and cooled with water, followed by removing the cured molded item.

The molded item was formed with a thin skin of epoxy resin, and the woven fabrics of glass fiber were found immediately below and along the skin in a state such that they were pressed onto the foam core in the inner layer. Thus, it was confirmed that a molded item with a composite sandwiched core having a cross-sectional structure as shown in FIG. 1 was obtained. The product had a specific density of 0.80, a flexural strength of 11.7 kg/mm$^2$, and a flexural modulus of 1335 kg/mm$^2$.

In FIG. 1, symbol a indicates a layer of expanded resin (expanded core) formed by solidification of a mixed slurry, symbol b is a set of separation layers b$_1$ each composed of two woven fabrics of glass fiber and a fibrous reinforcing material b$_2$, symbol c is a cured resin layer constituting the surface portion.

Separately, MATSUMOTO MICROSPHERE F-30D itself was heated to expand singly and suspended in water. The suspension was filtered using the woven fabric of glass fiber. Almost all of the particles remained on the filter material.

EXAMPLE 2

Using the same mold as used in Example 1, two sets of two woven fabrics of glass fiber (WE-181-100BV, a product by Nittobo Co.), each cut to a size of 160 mm and 60 mm wide were provided and each set was in advance dipped in an epoxy resin (100/30 by weight mixture of EPIKOTE 828/EPOMATE YLH006, each produced by Yuka Shell Epoxy Co.) to sufficiently impregnate the resin therein, and then affixed on the both surfaces of the mold. Next, a paste-like composition composed of the microballoons used in Example 1 (MATSUMOTO MICROSPHERE F-30D), inorganic microballoons (SILICA BALLOON Q-CEL, a product by Asahi Glass Co.), and the epoxy resin having the composition described above in a weight ratio of 14:17:69 was dipped up by a spoon and mounted on a side of the mold. The both surfaces of the mold were put together and the mold was clamped and placed upright. Then, the paste-like composition flew down to fill the mold to a height of 65 mm from the bottom.

After the upper vent of the mold was opened, the whole mold was dipped in a hot water bath kept at 90° C. After about 18 minutes, volume expansion started and a small amount liquid rein was spouted from the vent after 25 minutes, which indicated completion of the expansion. After 50 minutes, the mold was taken out of the bath, cooled with water and removed from the mold to obtain the objective molded item. The product had a specific density of 0.72, a flxural strength of 10.1 kg/mm$^2$, and a flexural modulus of 1387 kg/mm$^2$.

EXAMPLE 3

This is an example for the production of a rod of a circular section having an expanded core whose outer periphery was reinforced with a carbon fiber braid as a center material according to the process of the present invention.

FIGS. 2 and 3 illustrate this embodiment. More specifically, FIG. 2 is a cross-sectional view showing a state in which a metal mold 1 for a rod of circular cross section, a braid 3 made of carbon fibers having an outer diameter of 20 mm lined with an unwoven polyester cloth 2 with a mesh of 10 μm was arranged in the metal mold 1 and the mold was closed. Then, a paste-like mixture of particles 4 of vinylidene chloride copolymer (mean particle size: 20 μm, specific gravity after expansion: 0.02) including therein a low boiling point hydrocarbon which could expand to form microballoons upon heating at a temperature no lower than 80° C. and an epoxy resin 5 which could start curing at 70° to 80° C. was fed by a pump at the lower portion of the mold 1 and pushed into the inside of the plate to a length (height) by about ⅓ time or so as large as the overall length (height). Thereafter, the temperature of the mold was elevated to 80° C. After a while, gas entraining air bubbles started to come out from a vent 6 provided at the upper portion of the mold, and liquid epoxy resin was spouted.

After 2 hours, the mold was cooled down to obtain a composite molded item. The molded item thus obtained was taken out by opening the mold.

EXAMPLE 4

This is an example for the production of a plate composite sandwich core molded item according to the process of the present invention.

A stainless steel metal mold with a vent on the upper portion thereof and adapted for producing plates of a size of 160 mm long, 60 mm wide and 10 mm thick was provided. As the reinforcing material, a glass fiber felt of a thickness of 3 mm was provided which was obtained by cutting uni-directionally oriented glass fiber to two sets of two pieces, one being of a size of 160 mm long and 60 mm wide, and the other being of a size of 60 mm and 120 mm wide. One piece from each set was laminated with each other so that the direction of orientation of glass fiber in one piece crosses at right angles to that in another piece to thereby form two sheets of glass fiber, which sheets were then cut to stripes having a size of 120 mm long and 100 mm wide. Separately, a separation layer was provided which was prepared by forming a bag-like structure having a size of 150 mm long, 55 mm wide and 7 mm thick using a urethane foam sheet containing open cells and having thus contraction and expansion properties. Inside the bag was charged 20 g of a mixture of expandable particles of polystyrene (ESLENE BEAD HE type, a product of Sekisui Kaseihin Co., Ltd.), and an epoxy resin (a 100/31 mixture of EPIKOTE 828/EPOMATE YLH006, a product by Yuka Shell Epoxy Co.) in a weight ratio of 50/50, and the upper portion of the bag was sealed with an adhesive tape.

On the inner surface on the side of the cavity in the mold, a set of the reinforcing material 1 was arranged. Then, the epoxy resin having the above-described composition was coated on the reinforcing material arranged using a brush. On the thus-coated reinforcing material was placed the above-described bag and the epoxy resin was set thereon using a brush, followed by laminating thereon another set of the reinforcing material 1 and closing the mold.

The mold was placed upright and was dipped in an oil bath at 110° C. entirely with the vent being opend in the air. After 5 minutes, spouting of a small amount of liquid started. After 100 minutes, the mold was taken out of the bath and colled with water, and then the mold was opened to remove a molded item.

The molded item had a thin skin of the epoxy resin on the both surfaces. The glass fiber reinforcing material and sheet-like urethane foam underlay immediately below and along the skin in a state pressed against the foam core in the inner layer, and it was confirmed that a composite sandwiched core molded item was obtained which had a cross section as shown in FIG. 1.

EXAMPLE 5

An epoxy resin and a curing agent produced by Shell Co., i.e. EPILOTE 807 (100 parts) and EPOMATE YLH006 (31 parts) were mixed to form a liquid resin A.

Expandable microsphere, F-30D (44 parts) produced by Matsumoto Yushi Seiyaku Co. and inorganic hollow bead Q-Cell 575 (22 parts) produced by Asahi Glass Co. were mixed to form an expandable mixture B.

On the other hand, unwoven fabric made of fibers of polyethylene terephthalate and of polypropylene, i.e., unwoven fabric of available under trademark "UNICELL" was provided. Using this material, a bag having a size slightly smaller than the inside dimension of the mold was made. The expandable mixture B was packed into the bag.

Between two aluminum plates was made a mold inserting therein a TEFLON (PTFE) frame of a thickness of 3 mm. Nozzles were provided on the upper and lower ends thereof, respectively. Six sheets of glass cloth as large as the mold, and eight sheets of oblong (narrow tablet-form) glass cloth having the same length as the mold and the same width as that of the nozzle were prepared. Using the larger glass cloths, glass cloth/expandable mixture B packed in the bag/glass cloth were charged in this order in the mold. The smaller glass cloths were superimposed at the position where the nozzles were to be covered, i.e., the upper and lower ends were filled therewith. Excluding one of the nozzle portions, the liquid resin A was sufficiently coated on the glass cloths and the mold was closed. Using that nozzle, the inside of the mold was evacuated. Then, the mold was dipped in a hot water bath at 90° C. entirely and the nozzles was slightly opened after the inside pressure turned positive to draw out excess of the resin, followed by curing.

After 1 hour, the mold was taken out from the bath and cooled down. Thereafter, a molded product was taken out from the mold. Thus, a lightweight good sandwiched material having a surface portion of glass fiber-reinforced epoxy resin and an inner layer of an expanded epoxy resin was obtained. The product had a specific density of 0.89. The results of bending tests are as follows; a flexural strength: 20.7 kg/mm$^2$, and a flexural modulus: 1357 kg/mm$^2$.

EXAMPLE 6

An epoxy resin and a curing agent produced by Shell Co., i.e. EPIKOTE 807 (100 parts) and EPOMATE YLH006 (31 parts) were mixed to form a liquid resin A.

On the other hand, commercially available polypropylene beads PB-MG15P was obtained as the particles of the lightweight elastic material. The particles were left to stand so that they could undergo no thermal expansion. The apparent density of the beads was about 0.05 g/cm$^2$. The beads were provided in an amount of 36 parts.

Two male molds were provided which were adapted to produce fin-shaped models having a size of at most 120 mm wide, at most 350 mm long and at most 14 mm thick. The mold was provided with nozzles on the upper and lower portions thereof. Six sheets of glass cloth were prepared whose size was adapted for the mold. A bag having a size adapted for the mold was prepared with an unwoven polyester fabric "UNICELL BT-400", in which the above-described polypropylene beads were charged and the bag was sealed.

The polypropylene bead-incorporated bag was covered with the glass coth therearound and was housed in the mold. Then the mold was sealed. Pressure was applied to the mold with nitrogen gas so that the inner pressure of the mold reached 1.5 kg/cm$^2$. In this state, the epoxy resin was injected into the mold. The resin was pressed in from the lower nozzle and allowed to flow out from the upper nozzle. Then the nozzle was changed to a slightly opened state and it was closed while the resin was still coming out therefrom.

The mold containing the resin was dipped in a warm bath kept at 70° C. to cure the resin. After retaining for 1 hour, the mold was taken out from the warm bath. After cooling molded item was taken out from the mold. A good model was obtained which had a specific gravity of 0.8.

EXAMPLE 7

An unsaturated polyester resin, "YUPIKA X-314" (100 parts), a curing agent, "RUPASOL 224" (peroxide) (1 part) and a promotor "PRM" (cobalt catalyst) (0.5 part) were mixed to form a liquid resin B.

The same expanded polypropylene particles as those used in Example 6 (3 parts) and inorganic hollow balloon M28 produced by Asahi Glass Co. (1 part) were mixed to form a mixture C.

The same polyester/polypropylene unwoven cloth, "UNICELL", used in Example 6 was employed to prepare a bag having a size slightly smaller than the inside dimension of a mold to be used. The mixture C was packed in the bag.

On the other hand, a mold was formed by inserting a TEFLON (PTFE) frame between two aluminum plates, and the mold was provided with nozzles on the upper and lower ends thereof. Six sheets of glass cloth as large as the mold, and eight sheets of oblong (narrow tabletform) glass cloth having the same length as the mold and the same width as that of the nozzle were prepared. Using the larger glass cloths, glass cloth/expandable mixture C packed in the bag/glass cloth were charged in this order in the mold. The smaller glass cloths were superimposed at the position where the nozzles were to be covered, i.e., the upper and lower ends were filled therewith. The liquid resin B was pressed into the mold in the same manner as in Example 1, and the mold was dipped in a warm bath at 70° C. Then pressure was discharged After 1 hour, the mold was taken out from the bath. After cooling, a molded item was taken out from the mold. Thus, a good lightweight sandwiched material having an inner layer of the expanded polypropylene and polyester. The molded item had a flexural strength of 6.2 kg/mm² and a flexural modulus of 480 kg/mm².

EXAMPLE 8

Polypropylene beads PB-MG15P (produced by JSP Co.) were obtained. The beads were left to stand so that they could undergo no thermal expansion. The apparent density of the beads was about 0.05 g/cm². The beads were particles having a property of undergoing reduction in size when compressed and recovering their original volume when the pressure was relieved. The beads are named PPB.

An expoxy resin and a curing agent produced by Shell Co., i.e., EPIKOTE 1001 (this was in itself thermoplastic) (70 parts), EPIKOTE 348 (30 parts), phthalic anhydride (30 parts) and EPOMATE YLH 185 (1 part) were mixed at 80° C. to form a thermo-fusing resin A, PPB (50 parts) and Resin A (100 parts) were mixed at 80° C., and the mixture was charged in a mold preheated to 80° C. The mold was compressed under pressure of 7.5 kg/cm² and then immediately cooled in the refrigerator. Then, the mold was opened to obtain a sheet of about 5 mm thick. This sheet was called an intermediate material B.

A mold was prepared by inserting TEFLON (PTFE) frame of a thickness of 3 mm between two aluminum plates. Nozzles were provided on the upper and lower ends thereof, respectively. Two sheets of glass cloth as large as the mold, and ten sheets of oblong (narrow tablet-form) glass cloth having the same length as the mold and the same width as that of the nozzle were prepared. Using the larger glass cloths, glass cloth/intermediate material B/glass cloth were charged in this order in the mold. The smaller glass cloths were superimposed at the position where the nozzles were to be covered, i.e., the upper and lower ends, were filled with the smaller glass cloths superimposed one on another place of the intermediate material B so that the polypropylene beads did not enter inside. Using the both nozzles, the inside of the mold was evacuated. Then, the mold was entirely dipped in a silicone oil bath kept at 120° C. and heated. Small amounts of the resin and of gas were overflown from the nozzles and the nozzles were closed one by one. This was done almost at the same time. After heating it for 1 hour, the mold was taken out from the warm bath and cooled, followed by taking out a molded item from the mold. Thus, a good sandwiched composite material was obtained which was composed of a glass fiber-reinforced resin on the surface and an inner layer of an epoxy resin having dispersed therein expanded polypropylene. The molded item thus obtained contained molded product of polypropylene prevailed uniformly except where the smaller glass cloth was incorporated. The molded item had a density of 0.52 g/cm², a flexural strength of 3.3 kg/mm², and a flexural modulus of 397 kg/mm².

EXAMPLE 9

A phenoxy resin having the following chemical structure was provided. The resin showed fluidity at 140° C. upon experiment.

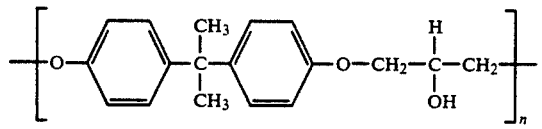

MICROSPHERE F-80SD (Matsumoto Yushi Seiyaku Co.) (50 parts), inorganic hollow balloon M28 produced by Asahi Glass Co. (30 parts) and the resin (100 parts) were mixed. The mixture was heatd up to 135° C. to fuse the phenoxy resin, and then cooled to obtain a plate-like molded item. This was called an intermediate material D.

On the other hand, a mold was formed by inserting a TEFLON (PTFE) frame between two aluminum plates, and the mold was provided with nozzles on the upper and lower ends thereof. Six sheets of glass cloth as large as the mold, and eight sheets of oblong (narrow tablet-form) glass cloth having the same length as the mold and the same width as that of the nozzle were prepared.

Polyester/polypropylene unwoven cloth, "UNICELL" was employed to prepare a bag whose size was determined in accordance with the inside dimension of the mold and taking into consideration the introduction of the smaller glass cloth on the upper and lower portions. In this bag, the intermediate material D was charged which was cut to a size slightly smaller than the inside dimension of the mold in view of the fact that the smaller glass cloth was to be introduced in the mold on the upper and lower portions thereof in accordance with the inside dimension of the mold. Using the large glass cloth, glass cloth/intermediate material D packed in the bag/glass cloth were charged in this order in the mold. The smaller glass cloths were superimposed at the position where the nozzles were to be covered, i.e., the upper and lower ends, were filled therewith. The mold was dipped in a warm bath kept at 150° C.

After 1 hour, the mold was taken out from the bath. After cooling, a molded item was taken out from the mold. Thus a good lightweight sandwiched material having a surface composed of glass-fiber-reinforced phenoxy resin and an inner layer composed of the expanded MICROSPHERE and the phenoxy resin. The molded item had a flexural strength of 23.2 kg/mm$^2$ and a modulus of elasticity of 963 kg/mm$^2$.

EXAMPLE 10

Epoxy resin EPIKOTE 1001 used in Example 8 is a resin which has a pour point of no higher than 80° C. and which in itself shows thermoplastic property. Using this resin alone, similar trial production was performed.

As the ressin was used EPIKOTE 1001, and this was mixed with PPB in a ratio of 100:100. After fusing the mixture at 80° C., pressure of 7.5 kg/cm$^2$ was applied to for a sheet-like intermediate material D, which was sandwiched by glass cloths and then housed in a mold. The mold was dipped in a warm bath kept at 100° C., and heated. The sample obtained was similar to that obtained in Example 8. The sample had a specific gravity of 0.45 g/cm$^3$, which value was smaller than the sample obtained in Example 8. On the other hand, in the case of EPIKOTE 1001 (100 parts), PPB (100 parts), glass beads M28 (50 parts) were mixed, the product had a specific gravity of 0.42, which means that the weight became lighter. As for the sizes of the expanded material and of the hollow material, the latter was remarkably small, and it was supposed that the cavity to be filled by the former was filled by the latter.

EXAMPLES 11 TO 13 AND COMPARATIVE EXAMPLES 1 TO 6

In this example, comparison was made between a monolithic molded item in which the reinforcing fiber was localized immediately below the surface and expanded substance was localized in other portions, and a molded item in which immediately below the skin were the expandable substance and the resin and on the other hand the reinforcing fiber and the resin were localized almost in the central portion, a molded item in which the reinforcing fiber was localized immediately below the surface and the expanded substance was present in the reinforcing fiber or a molded item in which the reinforcing fiber which would have been arranged immediately below the surface was omitted.

Epoxy resin and curing agent produced by Shell Co., i.e, EPIKOTE 807 (100 parts) and EPOMATE YLH006 (33 parts) were mixed. This was called Resin A.

MICROSPHERE F-50D produced by Matsumoto Yushi Seiyaku Co. (20 parts), Resin A (40 parts) were mixed. The mixture was called mixture B.

A mold was prepared in advance, which was a mold made of two aluminum plates and a TEFLON (PTFE) spacer and provided with a liquid outlet on each end. The thickness of the spacer was 3 mm.

Glass fiber cloth, MS253E-1040-2NT-10FS (plain weave), produced by Asahi Fiber Glass Co. was cut in accordance with the mold. On this was superimposed unwoven fabric, UNICELL BT0404 produced by Unicell Co., which was cut to the same size as the plain weave fabric. Resin A was coated on one mold half in a small thickness, and the above-described glass cloth/unwoven fabric was housed in this mold half fittedly and such that the glass cloth was faced outside. At the positions of the upper and lower nozzles, eight pieces of the glass cloth which was cut so as to have a width of 20 mm were incorporated and the mixture B was charged therein in the same manner. The other mold half was coated with the resin A, and the sheet having the same structure as above was housed therein so that it was substantially sticked thereto and that the glass cloth layer was faced outside. Then, the mold half was turned upside down and mounted on the mold half which contained the mixture B. The mold was closed and dipped in a warm bath kept at 110° C. and heated while discharging excess of the resin and air. The resin was cured while discharging excess of the resin and air. After 1 hour, the mold was taken out from warm the bath. After cooling, a mold item was taken out from the mold. The sample obtained had a thickness of 3 mm, a density of 0.76 g/cm$^2$, and was a monolithic molded item of epoxy resin in which glass cloth was present immediately below the surface and expanded balloons in other portions. This was called Sample (a).

Similarly, a monoithic molded item was obtained except that unwoven fabric UNICELL BT0404 was omitted. In this sample, expanded balloons were found in the surface. This was called sample (b).

Instead of MS364E-1040-2NT-10FS, glass fiber cloth WF-18-100BV (satin weave) produced by Nittobo Co. was cut in accordance with the mold. A sheet of unwoven fabric UNICELL BT0404 which was cut in the same manner was superimposed thereon to obtain a molded item in the same manner as Sample (a). This was called Sample (c). The molded item similar to Sample (a) was obtained.

The molding process was performed in the same manner as Sample (c) except that UNICELL BT0404 was omitted. The samle obtained as called Sample (d). This molded item had an appearance similar to that of Sample (a).

MS253E-1040-2NT-10FS, produced by Asahi Fiber Glass Co. was cut in accordance with the mold. UNICELL B00404 was cut to the same size and superimposed thereon. In one mold half, the mixture B was coated, and the glass cloth and UNICELL were mounted thereon, on which the mixture B was mounted. In the other mold half, the mixture B was coated in the same manner as above and mounted on the former mold half after turning it upside down. The mold was closed and was dipped in a warm bath kept at 110° C. and heated while discharging excess of the resin and air. The resin was cured while discharging excess of the resin and air. After 1 hour, the mold was taken out from warm the bath. After cooling, a mold item was taken out from the mold. Thus, a lightweight molded plate was obtained which had the epoxy resin/expanded balloon in the surface and glass-fiber-reinforced epoxy resin in the layer. This was called sample (e).

A sample was prepared in the same manner as Sample (e) except that UNICELL was omitted. This was called Sample (f).

A sample was molded in the same manner as Sample (e) except that glass fiber cloth WF-181-100B produced by Nittobo Co. was used in place of MS253E-1040-2NT-10FS produced by Asahi Fiber Glass Co. This was called Sample (g).

A sample was prepared in the same manner as Sample (g) except that UNICELL was omitted. This was called Sample (h).

UNICELL BT0404 was cut in accordance with the mold and housed in a mold half coated with the resin A. On this was placed the mixture B. On the other mold half was coated with the resin A similarly and UNICELL BT0404 was sticked thereto. This mold half was turned upside down and mounted on the former mold half. The mold was closed and was dipped in a warm bath kept at 110° C. and heated while discharging excess of the resin and air. After 1 hour, the mold was taken out from the bath. After cooling, a molded item was taken out from the mold. Thus, a lightweight molded plate was obtained which had the UNICELL/epoxy resin in the surface and expanded balloon/epoxy resin in the inner layer. This was called Sample (f).

Using Instron testing machine, bending tests were conducted and the results obtained are shown in Table below.

| Example | Sample | Maximum load (kg/mm$^2$) | Breaking load (kg/mm$^2$) | Modulus (kg/mm$^2$) | Elongation at break (%) |
|---|---|---|---|---|---|
| Ex. 11 | (a) | 13.0 | 11.8 | 705 | 2.5 |
| Ex. 12 | (c) | 18.4 | 16.9 | 947 | 2.2 |
| Ex. 13 | (d) | 19.5 | 19.3 | 914 | 2.6 |
| C. Ex. 1 | (b) | 10.8 | 9.1 | 603 | 2.1 |
| C. Ex. 2 | (e) | 1.5 | 1.1 | 118 | 2.3 |
| C. Ex. 3 | (f) | 9.3 | 8.1 | 458 | 2.4 |
| C. Ex. 4 | (g) | 2.7 | 2.1 | 164 | 2.7 |
| C. Ex. 5 | (h) | 2.0 | 1.8 | 149 | 1.7 |
| C. Ex. 6 | (i) | 0.7 | 0.3 | 30 | 2.9 |

From these Examples and Comparative Examples, it is apparent that in the case where the glass fiber cloth WF-181-10BV (satin weave) produced by Nittobo Co. was used, the separation membrane served as the reinforcing fiber as well, and the reinforcing fiber played the role of the separation membrane to prevent the passage of the expanded microballoons. Example 13 [Sample (d)] was an example in which the separation membrane and the reinforcing material were the same, and Example 12 [Sample (c)] confirmed this. In the case of MS253E-1040-2NT-10FS (plain weave) produced by Asahi Fiber Glass Co., the particles were not prevented and the separation membrane used was unwoven fabric, UNICELL BT0404, and in this example, the reinforcing fiber was used separately. Example 11 [Sample (a)] is to exemplify this case and Comparative Example 1 [Sample (b)] confirmed this. Further, in Comparative Examples 2 to 5 [Samples (e) to (h)], the reinforcing fiber was localized immediately below the skin and expanded substance in other portions. Thus these examples demonstrate that separately localization is important for the physical properties of the molded items. Comparative Example 6 [Sample (i)] shows that contribution of the unwoven fabric UNICELL BT0404 used as the separation membrane as the reinforcing material was negligible.

EXAMPLE 14

This is an example which is intended to demonstrate that appropriate separation membrane varies with varying expanded beads and in which woven fabric is used as the separation membrane.

Thermoexpandable extended beads produced by Matsumoto Yushi Seiyaku Co., MICROSPHERE F-50D, and EXPANCEL-461 produced by Nobel Ind.) were provided. Both of them were expandable at 100° to 110° C. Hereinafter, they are abbreviated as F-50D and EXPANCEL-461.

Epoxy resin and curing agent produced by Shell Co., EPIKOTE 807 (100 parts) and EPIMATE YLH006 (31 parts) were mixed. This was called Resin A.

Resin A (100 parts) and F-50D (100 parts) were mixed. This was called Mixture B. Resin B (100 parts) and EXPANCEL-461 (100 parts) were mixed. This was called Mixture C.

A mold was prepared by inserting a TEFLON (PTFE) frame between two aluminum plates. Nozzles were provided on the upper and lower ends thereof, respectively.

UNCELL (unwoven fabric BT0404) and Nylon Tafta (woven fabric, Shirasaki Kogyo, SL2510) were provided and bags were formed with these fabrics. The mixtures B and C were charged in these bags, respectively. UNICELL/Mixture B, Nylon Tafta/Mixture B, UNICELL/Mixture C, and Nylon Tafta/Mixture C were called, intermediate materials (1), (2), (3) and (4), respectively. On the other hand, the glass fiber cloth MS253E-1040-2NT-10FS produced by Asahi Fiber Glass Co. was provided. Two sheets of the glass cloth as large as the mold, and ten sheets of the oblong (narrow tablet-form) glass cloth having the same length and width as those of the mold and wide enough to cover the nozzle were prepared. Using the larger glass cloths, glass cloth/intermediate materials (1) to (4)/glass cloth were charged in this order in the mold. The smaller glass cloths were superimposed at the position where the nozzles were to be covered, i.e., the upper and lower ends, were filled, with the smaller glass cloths superimposed one on another.

Using the both nozzles, the inside of the mold was evaluated. Then, the mold was entirely dipped in a silicone oil bath kept at 110° C. and heated. Small amounts of the resin and of gas were overflown from the nozzles and the nozzles were closed one by one. This was done almost at the same time. After heating it for 1 hour, the mold was taken out from the warm bath and cooled, followed by taking out a molded item from the mold. The molded items obtained using the intermediate materials (1), (2) and (4) contained the glass fiber-reinforced epoxy resin in the surface thereof and the epoxy resin having dispersed therein expanded beads in the inner layer and were found to be good sandwiched composite materials. On the contrary, in the molded item using the intermediate material (3), the expanded beads appeared on the surface thereof. In the case where F-50D was used, both UNICELL and Nylon Tafta revealed to be a good separation membrane. However, when EXPANCEL-461 was used, UNICELL did not exhibit a function of the separation membrane but Nylon Tafta did.

The molded item using the intermediate material (1) had a specific gravity of 0.63, a flexural strength of 9.7 kg/mm$^2$, and a flexural modulus of of 883 kg/mm$^2$, that using the intermediate material (3) had a specific gravity of 0.74, a flexural strength of 9.6 kg/mm$^2$, and a flexural modulus of 886 kg/mm$^2$, that using the intermediate material (3) had a specific gravity of 0.80, a flexural strength of 12.5 kg/mm$^2$, and a flexural modulus of 886 kg/mm$^2$.

EXAMPLE 15

This is an example in which square bar was prepared.

A mold having a cross section of 20 mm×20 mm and a length of 500 mm was prepared. The mold was provided with a nozzle on each end. Epoxy resin An epoxy resin, i.e., EPIKOTE 807 (100 parts), and a curing agent, i.e., EPOMATE YLH006 (31 parts), both produced by Shell Co., were mixed to form a liquid resin A. The amount of the resin was 393 g. On the other hand, commercially available polypropylene beads PB-MG15P was obtained as the particles of the lightweight elastic material. The particles were left to stand so that they could undergo no thermal expansion. The apparent density of the beads was about 0.05 g/cm$^3$. The beads, which had elasticity and could recover the original state if compressed, were provided in an amount of 10 parts.

A tube having a peripheral length of 80 mm was made of UNICELL BT0404, in which a half amount of the above-described polypropylene beads was packed.

The UNICELL tube packed with the polypropylene beads was covered with two layers of carbon fiber braid and a single layer of glass fiber braid. The braids used were Toreca T-3964 and Toreca T-3484, and the glass fiber braids used were Atkins and Beers #9273. The braids were superimposed in the order of T-3484, #9273 and T-3964.

The laminate was housed in the above-described mold and the rest half of the polypropylene beads was pressed into the mold, and the tube of UNICELL and the mold were closed.

The mold was placed horizontally, and the inner pressure was reduced with a vacuum pump to substantially attain complete vacuum once, and then pressurized using nitrogen. The mold was kept at a pressure of 1.5 kg/cm$^2$ and the liquid resin A was pressed thereinto. When overflow of the resin was confirmed, charging of the resin was stopped.

The mold was dipped in a warm bath kept at 70° C. and pressure venting was performed while discharging the resin. After 1 hour, the mold was taken out from the warm bath. After cooling, a molded item was taken out from the mold. Thus, a lightweight square bar was obtained, which was composed of the carbon/glass fiber reinforced epoxy resin in the surface and the epoxy resin having dispersed therein expanded polypropylene. The specific gravity of the molded item inclusive the skin was 0.56 g/cm$^3$

EXAMPLE 16

This is another example for the prodcution of the fin (skag) of sailing board.

A mold for the fin of a sailing board was prepared with a resin in advance. A liquid outlet was provided on each end of the mold. The mold used was of two-split type, each having a maximum width of 120 mm, a maximum length of 350 mm and the mold had a maximum thickness of cavity of 14 mm. The mold was provided with a nozzle on each of the upper and lower ends.

An epoxy resin, i.e., EPIKOTE 807 (100 parts), and a curing agent, i.e., EPOMATE YLH006 (31 parts), both produced by Shell Co., were mixed to form a liquid resin A.

MICROSPHERE F-30D produced by Matsumoto Yushi Seiyaku Co. (20 parts) and inorganic balloons M-28 produced by Asahi Glass Co. (10 parts) were mixed. The resulting mixture was mixed with about ⅓ of the resin A. The mixture was called Mixture B.

A piece of plain weave union fabtic of carbon fiber cloth T-400 produced by Toray Ind. and aramide fiber TECNOLA produced by Teijin Limited, two pieces of glass fiber cloth WF-181-100BV produced by Nittobo Co. and a piece of polyester unwoven fabric UNICELL T-4040 were cut in accordance with the mold and laminated one on another. Two sets were combined to form a cavity, in which the mixture B was introduced. The resulting material was housed in the mold for molding. After clamping the mold, the remainder of the resin A was poured into the fiber layer in the mold while discharging air therefrom. The pouring was continued until overflow of the resin was confirmed.

After closing one of the liquid outlet and the mold was dipped in a warm bath kept at 80° C. and heated, with the other liquid outlet which was still open being positioned upward. After 1 hour, the mold was taken out from the bath. After cooling, a molded item was taken out from the mold. Thus, a beautiful, fashionable, lightweight fin having good characteristics was obtained, which was composed of a surface of the epoxy resin, an outer shell of the carbon fiber/aramide fiber glass fiber-reinforced epoxy resin, and a core of the expanded particles of inorganic beads and microspheres.

EXAMPLE 17

A mold having a cross section of 20 mm×20 mm and a length of 500 mm was prepared. The mold was provided with a nozzle on each end.

An epoxy resin, i.e., EPIKOTE 807 (100 parts), and a curing agent, i.e., EPOMATE YLH006 (31 parts), both produced by Shell Co., were mixed to form a liquid resin A.

Commercially available MICROSPHERE F-30D produced by Matsumoto Yushi Seiyaku Co. was obtained and 20 parts of this was mixed with inorganic balloons M-28 produced by Asahi Glass Co. (10 parts).

A tube was prepared with UNICELL BT0404, in which ½ volume of the above-described mixed bead was packed. The UNICELL tube packed with the polypropylene beads was covered with two layers of carbon fiber braid and a single layer of glass fiber braid. The braids used were Toreca T-3964 and Toreca T-3484, and the glass fiber braids used were Atkins and Beers #9273. The braids were superimposed in the order of T-3484, #9273 and T-3964.

The laminate was housed in the above-described mold and the remainder of the mixed beads was pressed into the mold, and the tube of UNICELL and the mold were closed.

The mold was placed horizontally, and the inner pressure was reduced with a vacuum pump to substantially attain complete vacuum once, and then pressurized using nitrogen. The mold was kept as it was and the liquid resin A was pressed thereinto. When overflow of the resin was confirmed, charging of the resin was stopped.

The mold was dipped in a awrm bath kept at 70° C. and curing was performed while discharging the resin. After 1 hour, the mold was taken out from the warm bath. After cooling, a molded item was taken out from the mold. Thus, a lightweight square bar was obtained, which was composed of a surface of the carbon/glass fiber-reinforced epoxy resin and an inner layer of the epoxy resin having dispersed therein expanded particles of inorganic balloons/microspheres. The specific gravity of the molded item inclusive the skin was 0.62 g/cm$^3$.

EXAMPLE 18

This is an example for the production of a plate composite sandwich core molded item, using the crushed products of used molded items.

Using a stainless steel metal mold for molding a plate having a liquid path capable of letting a heating medium of 360 mm in length, 260 mm in width and 20 mm in thickness flow through, a piece of glass fiber plain cloth (unit weight: 200 g/cm$^2$) was set on both sides of the cavity wall of the inner surface of the mold as a reinforcing material. Then, into a bag of elastic polyester unwoven cloth with small openings of 320 mm in length, 220 mm in width and 10 mm in thickness was put 360 g of a mixture comprising the crushed products having an average size of about 2 m crushed finely by a hammer mill of composite molding items (integral density: 0.42 g/cm$^3$) comprising a surface portion of glass fiber molded by an epoxy resin and a foamed core portion composed of an epoxy resin, expandable particles of polystyrene (ESLENE BEAD HE type, a product of Sekisui Kaseihin Co., Ltd.) and an epoxy resin (a 100/31 mixture of EPIKOTE/EPOMATE, a product by Yuka Shell Epoxy Co.) in a weight ratio of 55/5/40. The upper portion of the bag was sealed with a heat seal and the bag was inserted into the mold.

The mold was closed and oil of 110° C. was flowed into the mold with a vent opened in the air. After 45 minutes, the mold was cooled and opened to remove a molded item.

The molded item had a thin skin of the epoxy resin free from such defects as voids on both surfaces. The glass fiber reinforcing material existed immediately below and along the skin in a state pressed against the foam core in the inner layer (glass fiber volume content: 42%). It was confirmed that a composite sandwich core molded item (integral density: 0.80 g/cm$^3$) was obtained which had a foam core containing crushed products firmly combined to the inner side.

What is claimed is:

1. A process for the production of an integral composite molded item comprising:
   (i) a surface portion comprising a synthetic resin phase containing a fibrous reinforcing material,
   (ii) a core portion comprising the synthetic resin phase containing bubble-containing particles, and
   (iii) a separation layer positioned between the surface portion and the core portion, the process comprising the steps of:
      (a) providing in a substantially sealed mold a separation layer which does not substantially pass therethrough expandable particles or compressed lightweight particles of an elastic material but which is capable of passing a synthetic resin or its precursor that is liquidized at the time of molding, the separation layer having inner and outer side surfaces, the outer side surface of the separation layer facing towards an inner surface of the mold and the inner side surface of the separation layer facing away from the inner surface of the mold;
      (b) providing the synthetic resin or its precursor in the mold on either or both sides of the separation layer;
      (c) arranging a fibrous reinforcing material between the outer side surface of the separation layer and the inner surface of the mold, the fibrous reinforcing material being integrated with the separation layer or separate from the separation layer but associated therewith;
      (d) providing an aggregate of expandable particles and/or of compressed particles of lightweight elastic material on the inner side surface of the separation layer;
      (e) causing volume expansion of the aggregate of expandable particles by elevation of temperature to thereby expand the expandable particles or causing volume expansion of the aggregate of compressed lightweight particles by relieving compression on the compressed lightweight particles to thereby expand the lightweight particles;
      (f) causing the synthetic resin or its precursor to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;
      (g) completing solidification of the synthetic resin to form an integral composite molded item having a surface portion comprising the synthetic resin phase containing the fibrous reinforcing material and a core portion comprising the synthetic resin phase containing the expanded particles, which portions are separated by the separation layer; and
      (h) taking out the resulting composite molded item from the mold.

2. A process for the production of an integral composite molded item comprising
   (i) a surface portion comprising a synthetic resin phase containing a fibrous reinforcing material,
   (ii) a core portion comprising the synthetic resin phase containing bubble-containing particles, and
   (iii) a separation layer positioned between the surface portion and the core portion, the process comprising the steps of:
      (a) providing in a substantially sealed mold a separation layer which does not substantially pass therethrough expandable particles but which is capable of passing a thermosetting resin or its precursor that is liquidized at the time of molding, the separation layer having inner and outer side surfaces, the outer side surface of the separation layer facing towards an inner surface of the mold and the inner side surface of the separation layer facing away from the inner surface of the mold;
      (b) providing the thermosetting resin or its precursor in the mold on either or both sides of the separation layer;
      (c) arranging a fibrous reinforcing material between the outer side surface of the separation layer and the inner surface of the mold, the fibrous reinforcing material being integrated with the separation layer or separate from the separation layer but associated therewith;
      (d) providing an aggregate of expandable particles on the inner side surface of the separation layer;

(e) causing volume expansion of the aggregate of expandable particles by elevation of temperature to thereby expand the expandable particles;

(f) causing the thermosetting resin or its precursor to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;

(g) curing the thermosetting resin or its precursor to complete solidification of the thermosetting resin to form an integral composite molded item having a surface portion comprising the synthetic resin phase containing the fibrous reinforcing material and a core portion comprising the synthetic resin phase containing the expanded particles, which portions are separated by the separation layer; and (h) taking out the resulting composite molded item from the mold.

3. A process for the production of an integral composite molded item comprising
   (i) a surface portion comprising a synthetic resin phase containing a fibrous reinforcing material,
   (ii) a core portion comprising the synthetic resin phase containing bubble-containing particles, and
   (iii) a separation layer positioned between the surface portion and the core portion, the process comprising the steps of:
   (a) providing in a substantially sealed mold a separation layer which does not substantially pass therethrough compressed lightweight particles of an elastic material but which is capable of passing a thermoplastic resin or thermosetting resin that is liquidized at the time of molding, the separation layer having inner and outer side surfaces, the outer side surface of the separation layer facing towards an inner surface of the mold and the inner side surface of the separation layer facing away from the inner surface of the mold;
   (b) providing the thermoplastic or thermosetting resin in the mold on either or both sides of the separation layer;
   (c) arranging a fibrous reinforcing material between the outer side surface of the separation layer and the inner surface of the mold, the fibrous reinforcing material being integrated with the separation layer or separate from the separation layer but associated therewith;
   (d) providing an aggregate of compressed particles of lightweight elastic material on the inner side surface of the separation layer;
   (e) causing volume expansion of the aggregate of the compressed lightweight particles by relieving compression on the compressed lightweight particles to thereby expand the lightweight particles;
   (f) causing the resin to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;
   (g) completing solidification of the resin to form an integral composite molded item having a surface portion comprising the synthetic resin phase containing the fibrous reinforcing material and a core portion comprising the synthetic resin phase containing the expanded particles, which portions are separated by the separation layer; and
   (h) taking out the resulting composite molded item from the mold.

4. A process for the production of an integral composite molded item comprising
   (i) a surface portion comprising a synthetic resin phase containing a fibrous reinforcing material,
   (ii) a core portion comprising the synthetic resin phase containing bubble-containing particles, and
   (iii) a separation layer positioned between the surface portion and the core portion, the process comprising the steps of:
   (a) providing in a substantially sealed mold a separation layer which does not substantially pass therethrough expandable particles but which is capable of passing a thermoplastic resin that is liquidized at the time of molding, the separation layer having inner and outer side surfaces, the outer side surface of the separation layer facing towards an inner surface of the mold and the inner side surface of the separation layer facing away from the inner surface of the mold;
   (b) providing the thermoplastic resin in the mold on either or both sides of the separation layer;
   (c) arranging a fibrous reinforcing material between the outer side surface of the separation layer and the inner surface of the mold, the fibrous reinforcing material being integrated with the separation layer or separate from the separation layer but associated therewith;
   (d) providing an aggregate of expandable particles on the inner side surface of the separation layer;
   (e) causing melting of the thermoplastic resin by elevation of temperature, and causing volume expansion of the aggregate of expandable particles by elevation of temperature to thereby expand the expandable particles;
   (f) causing the molten thermoplastic resin to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;
   (g) completing solidification of the thermoplastic resin to form an integral composite molded item having a surface portion comprising the synthetic resin phase containing the fibrous reinforcing material and a core portion comprising the synthetic resin phase containing the expanded particles, which portions are separated by the separation layer; and
   (h) taking out the resulting composite molded item from the mold.

5. A process as claimed in any one of claims 1 to 4, wherein the separation layer is a structural material integrated with the fibrous reinforcing material.

6. A process as claimed in any one of claims 1 to 4, wherein the separation layer is a material selected from the group consisting of woven fabics, knitted fabrics, unwoven fabrics, webs, paper, metal gauzes and porous membranes which passes therethrough substantially none of the expandable particles nor the compressed particles of the lightweight elastic material.

7. A process as claimed in any one of claims 1 to 4, wherein the fibrous reinforcing material is a material selected from the group consisting of woven fabrics, knitted fabrics, unwoven fabrics, unidirectionally oriented filaments and webs.

8. A process as claimed in any one of claims 1 to 4, wherein the fibrous reinforcing material is at least one fiber selected from the group consisting of glass fiber, carbon fiber, silicon carbide fiber, metal fiber, aramide fiber, polyallylate fiber, polyolefin fiber, nylon fiber and polyester fiber.

9. A process as claimed in any one of claims 1, 2 and 4, wherein the expandable particles are capable of undergoing volume expansion by heating and include therein bubbles after expansion.

10. A process as claimed in any one of claims 1, 2 and 4, wherein the expandable particles have a mean particle size of from about 1 μm to about 5 mm.

11. A process as claimed in any one of claims 1, 2 and 4, wherein the expandable particles are capable of undergoing volume expansion of at least 10% by heating.

12. A process as claimed in any one of claims 1, 2 and 4, wherein the expandable particles comprises polyvinylidene chloride, polystyrene or polystyrene copolymer, polyolefin or polyphenylene oxide copolymer.

13. A process as claimed in claim 1 or 3, wherein the particles of the lightweight elastic material have a mean particle size of from about 50 μm to about 10 mm in a non-compressed state.

14. A process as claimed in claim 1 or 3, wherein the particles of the lightweight elastic material can recover their volume by relieving compression applied thereto to a level from about 10% to about 100% based on an original volume thereof.

15. A process as claimed in claim 1 or 3, wherein the particles of the lightweight elastic material is formed of polyolefin, polyethylene, natural rubber or synthetic rubber.

16. A process as claimed in any one of claims 1, 3 and 4, wherein the thermoplastic resin is molten at a molding temperature.

17. A process as claimed in any one of claims 1, 3 and 4, wherein the thermoplastic resin shows fluidity at a temperature of from about 70° C. to about 230° C.

18. A process as claimed in any one of claims 1, 3 and 4, wherein the thermoplastic resin is polyolefin, polystyrene, crystalline liquid polyallylate resin or phenoxy resin.

19. A process as claimed in claim 1 or 2, wherein the resin or its precursor has a fluidity at least at a molding temperature.

20. A process as claimed in claim 1 or 2, wherein the resin is polyurethane, epoxy resin, unsaturated polyester, polyvinyl ester, or polycycloolefin resin.

21. A process as claimed in any one of claims 1, 2 and 4, wherein the aggregate of the expandable particles contain non-expandable foamed particles.

22. A process as claimed in claim 21, wherein the expandable particles and the non-expandable foamed particles are present in a weight ratio in the range of from 10:1 to 1:2.

23. A process as claimed in claim 21 or 22, wherein non-expandable foamed particles are inorganic microballoons.

24. A process as claimed in claim 1 or 3, wherein the aggregate of the particles of the lightweight elastic material contain non-expandable foamed particles.

25. A process as claimed in claim 24, wherein the particles of the lightweight elastic material and non-expandable foamed particles are present in a weight ratio in the range of from 10:1 to 1:2.

26. A process as claimed in claim 24, wherein the non-expandable foamed particles are inorganic microballoons.

27. A process as claimed in any one of claims 1 to 4, wherein the separation layer is of a bag-like structure.

28. A process as claimed in any one of claims 1 to 4, wherein the separation layer is a bag-like structure in which the aggregate of the expandable particles or the compressed particles of the lightweight elastic material are contained.

29. A process as claimed in any one of claims 1 to 4, wherein the separation layer is a bag-like structure in which the aggregate of the expandable particles or the compressed particles of the lightweight elastic material, and the synthetic resin or its precursor are contained.

30. A process as claimed in any one of claims 27 to 29, wherein a short fiber or whisker is contained in the bag-like structure.

31. A process for the production of an integral composite molded item comprising
(i) a surface portion comprising a synthetic resin phase containing a fibrous reinforcing material,
(ii) a core portion comprising the synthetic resin phase containing bubble-containing particles, and
(iii) a separation layer positioned between the surface portion and the core portion, the process comprising the steps of:
(a) providing in a substantially sealed mold a separation layer which does not substantially pass therethrough expandable particles or compressed lightweight particles of an elastic material but which is capable of passing a synthetic resin or its precursor that is liquidized at the time of molding, the separation layer having inner and outer side surfaces, the outer side surface of the separation layer facing towards an inner surface of the mold and the inner side surface of the separation layer facing away from the inner surface of the mold;
(b) providing the synthetic resin or its precursor in the mold on either or both sides of the separation layer;
(c) arranging a fibrous reinforcing material between the outer side surface of the separation layer and the inner surface of the mold, the fibrous reinforcing material being integrated with the separation layer or separate from the separation layer but associated therewith;
(d) providing an aggregate of expandable particles and/or of compressed particles of lightweight elastic material together with crushed products of used resin molded items on the inner side surface of the separation layer;
(e) causing volume expansion of the aggregate of the expandable particles by elevation of temperature to thereby expand the expandable particles or of the aggregate of compressed lightweight particles by relieving compression on the compressed lightweight particles to thereby expand the lightweight particles;

(f) causing the synthetic resin or its precursor to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;

(g) completing solidification of the synthetic resin to form an integral composite molded item having a surface portion comprising the synthetic resin phase containing the fibrous reinforcing material and a core portion comprising the synthetic resin phase containing the expanded particles which portions are separated by the separation layer; and (h) taking out the resulting composite molded item from the mold.

32. A process for the production of an integral composite molded item comprising
 (i) a surface portion comprising a synthetic resin phase containing a fibrous reinforcing material,
 (ii) a core portion comprising the synthetic resin phase containing bubble-containing particles, and
 (iii) a separation layer positioned between the surface portion and the core portion, the process comprising the steps of:
 (a) providing in a substantially sealed mold a separation layer which does not substantially pass therethrough expandable particles but which is capable of passing a thermosetting resin or its precursor that is liquidized at the time of molding, the separation layer having inner and outer side surfaces, the outer side surface of the separation layer facing towards an inner surface of the mold and the inner side surface of the separation layer facing away from the inner surface of the mold;

(b) providing the thermosetting resin or its precursor in the mold on either or both sides of the separation layer;

(c) arranging a fibrous reinforcing material between the outer side surface of the separation layer and the inner surface of the mold, the fibrous reinforcing material being integrated with the separation layer or separate from the separation layer but associated therewith;

(d) providing an aggregate of expandable particles together with crushed products of used resin molded items on the inner side surface of the separation layer;

(e) causing volume expansion of the aggregate of expandable particles by elevation of temperature to thereby expand the expandable particles;

(f) causing the thermosetting resin or its precursor to flow through the separation layer to thoroughly disperse it between the separation layer and the mold, between the separation layer and the expanded particles, and among the expanded particles to thereby fill any voids therebetween, while pressing the separation layer towards the inner surface of the mold, as the result of volume expansion in the step (e) above;

(g) curing the thermosetting resin or its precursor to complete solidification of the thermosetting resin to form an integral composite molded item having a surface portion comprising the synthetic resin phase containing the fibrous reinforcing material and a core portion comprising the synthetic resin phase containing the expanded particles which portions are separated by the separation layer; and (h) taking out the resulting composite molded item from the mold.

* * * * *